Sept. 28, 1937.  I. HARRISON  2,094,535
CRANBERRY RELEASING MACHINE
Filed April 22, 1936  2 Sheets-Sheet 1
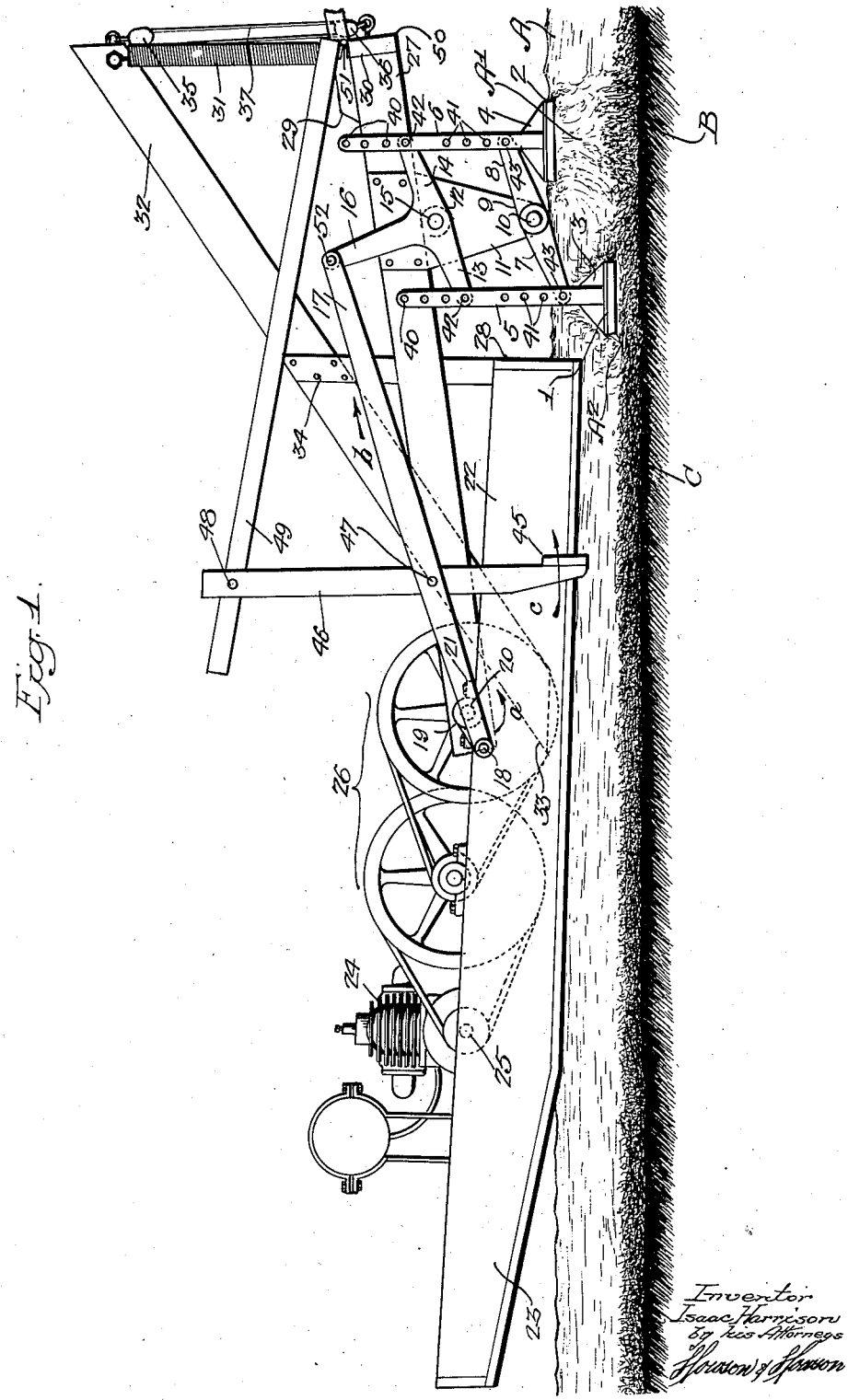

Sept. 28, 1937.   I. HARRISON   2,094,535
CRANBERRY RELEASING MACHINE
Filed April 22, 1936   2 Sheets-Sheet 2
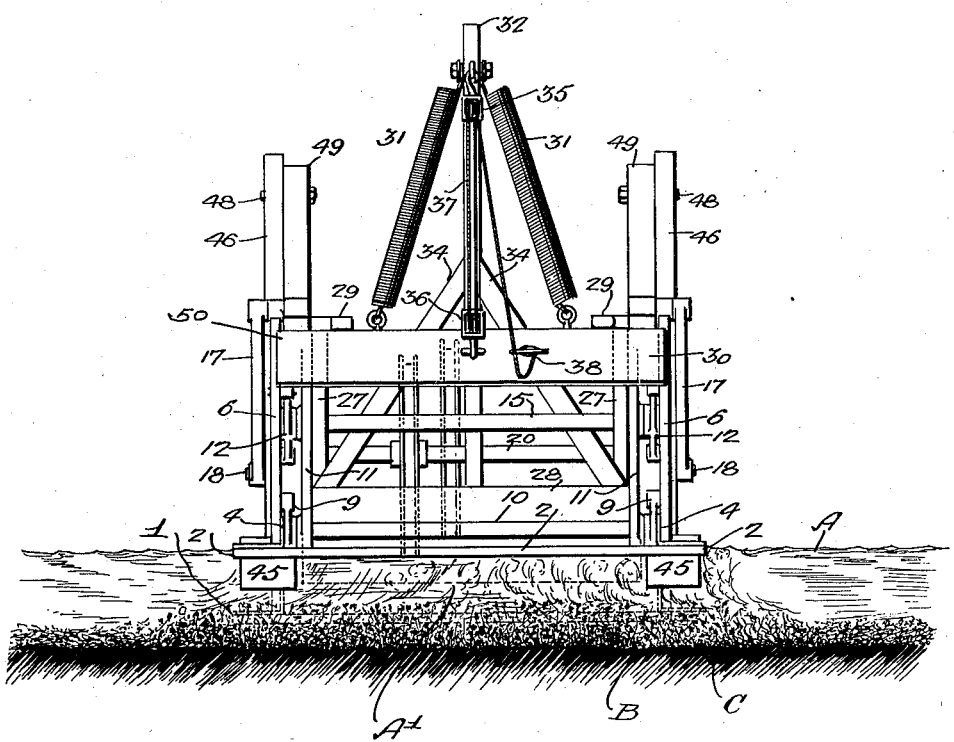

Patented Sept. 28, 1937

2,094,535

UNITED STATES PATENT OFFICE 2,094,535

CRANBERRY RELEASING MACHINE

Isaac Harrison, Crosswicks, N. J.

Application April 22, 1936, Serial No. 75,798

20 Claims. (Cl. 56—8)

This invention relates to a device adapted for use in flooded cranberry bogs, and the purpose of the device is to cause cranberries which have become detached from the vines during harvesting, or otherwise, but which are held submerged in the water covering the bog by the floating runners and/or other more or less entangled parts of the vines, to rise to the surface of the water, in order that they may be readily gathered.

The primary object of the invention is to produce a device which will set up an agitation of the water and the vines such as will cause the vine mass to open up and release the berries entrapped therein and thereunder, permitting the loose berries to float and rise to the surface of the water under their own inherent buoyancy.

Another object of the invention is to construct the agitating means in a manner to produce horizontal and vertical surges of the water which will agitate the vines and thereby release loose berries from the vine mass.

Another object of the invention is to provide a simple, light and efficient apparatus which can be floated and moved about in relatively shallow water without becoming snagged by the vines; and which can be readily steered over the bog without the use of complicated rudders, etc.; and which can be readily removed from the bog and transported from one bog to another.

Another object of the invention is to construct the agitating mechanism in such a manner that no revolving parts will at any time be in the water, thereby eliminating the possibility of the floating runners being caught and torn, or uprooted by parts revolving in the water.

Another object of the invention is to construct the device in such a manner that the agitating mechanism will at all times be under direct control and in full view of the operator and arranged so that the operating depth of the agitating mechanism may be varied instantly and at will as conditions may require while the device is being operated over various areas of the bog.

Another object of the invention is to provide a simple and efficient means for propelling the device over the bog and which takes the form of mechanically operated dip paddles in preference to revolving screw propellers which would become entangled in the vine.

Another object of the invention is to connect the propelling mechanism with the support for the agitating mechanism, whereby the depth to which the paddles dip will vary in accordance with the operating depth of the agitating means.

Another object of the invention is to mount the agitating means and propelling means on a counterbalanced or spring-supported framework provided with suitable handles by which the operator may readily raise and lower the agitating mechanism and propelling means at will.

The construction and operation of the device will be fully disclosed hereinafter, reference being had to the accompanying drawings; of which:

Fig. 1 is a side elevation illustrating the device mounted on a boat or scow floating in the water flooding the bog; and Fig. 2 is a rear elevation.

Ordinarily cranberry bogs are located in marshy ground and arranged so that the bog may be flooded to a depth of substantially 12" more or less as desired and under certain conditions. However, when the crop of cranberries is being harvested the bog is not normally flooded.

The harvesting machinery used will ordinarily gather 75 to 85%, more or less, of the total crop, the other 15 to 25%, more or less, becoming detached from the vines during harvesting and falling down through the vines, becoming entangled in the mass of vines or entrapped under the vines.

Heretofore, it has not been economically practical to attempt to recover the relatively large percentage of the total crop represented by the loose fallen berries, and in an endeavor to recover this loss the bogs have been flooded, after dry harvesting, to cause the detached berries to float. However, simply flooding the bog made it possible to recover only what small percentage of the detached berries which were lying on top of the vines and which had not worked down into the mass or through the mass to the under part thereof.

The present invention is directed primarily to mechanism for creating an agitation of the vines and a surging of the water through the vines to release the entrapped berries, and for this purpose a pair of alternately operable vertically reciprocable agitators 1 and 2 is provided. These agitators, as shown in Figs. 1 and 2, are of the simplest construction, without projections of any kind which would have a tendency to become entangled in the vines, thereby eliminating damage to the vines. The agitators 1 and 2 merely comprise in the present instance flat wooden planks disposed in horizontal parallel and laterally spaced relation to each other.

By merely raising and lowering the agitating planks 1 and 2 alternately or simultaneously in opposition to each other, and without lifting either plank out of the water, and without permitting either plank to penetrate to the full depth of the water, a surging of the water A in the manner indicated at A¹ and A² is created, which causes an agitation of the vines B which, together with the surging of the water through the vines, loosens or frees the entrapped berries and permits them to float to the surface of the water A.

By maintaining the agitators 1 and 2 at all times within the body of water A, i. e. without raising the agitators clear of the water, as each agitator moves upwardly it creates a sort of suction at the under side thereof, due to the rushing of the water under the plank as the plank is raised, and this causes the surging of the water as noted above.

As the plank descends to a level adjacent the top of the vine mass, the water is pushed outwardly from under the plank and causes an opposite surging or agitation of the water in the vines which drives out the loose berries from within and from under the vine mass.

By the use of the above noted method and apparatus a substantially 100% crop can be recovered.

While it is obvious that one plank or equivalent suction-producing element or apparatus may be used and raised and lowered as noted without departing from the spirit of the invention, a pair of such agitating elements operating alternately or oppositely in relatively close but laterally spaced parallel relationship to each other adds to the efficiency of the device and makes the device easier to handle as will be apparent from the following description, the upward movement of one plank being opposed by the downward movement of the other plank, making it easier to maintain the operation of the agitators at a desired depth.

In the present instance, the upper surfaces of the agitating planks 1 and 2 are provided with suitable feet or brackets 3 and 4 respectively at the opposite ends thereof. Secured to the feet 3, 3 and 4, 4 are vertically extending posts 5, 5 and 6, 6 respectively. Pivotally attached to the lower portions of the posts 5, 5 and 6, 6 are the opposite ends 7, 7 and 8, 8 respectively of rocking levers 9, 9.

The levers 9, 9 at the opposite ends respectively of the agitators are secured to or pivotally mounted on a transversely extending shaft 10, said shaft being mounted for oscillation in the lower parts of brackets 11, 11.

The upper portions of the posts 5 and 6 at each side of the apparatus are pivotally connected to arms 13 and 14 of suitable inverted T-shaped or double bell-crank lever 12, said bell-crank levers at the opposite sides of the device being secured to or pivotally mounted on a transversely extending shaft 15 which is mounted for oscillation in the upper portion of the brackets 11, 11, said shaft 15 being substantially parallel to the lower oscillating shaft 10.

The T-shaped or double bell-crank levers 12, 12 are each provided with a third arm 16, to which is pivotally connected one end of a reach rod 17, the opposite end of which is rotatably mounted on a crank pin 18 carried by the outer end of a crank lever 19.

The crank levers 19, 19 are secured to a transversely extending shaft 20, said shaft being rotatably mounted in bearings 21 which, in the present instance, are secured to the gunnels or upper edges of the side planks 22 of a suitable flat bottom boat or scow 23.

The crank shaft 20 is adapted to be rotated in one direction constantly by any suitable prime mover, such, for example, as an internal combustion engine 24 which is mounted in the forward end of the boat 23, power being transmitted from the engine or other motor 24 to the crank shaft 20, at any desired speed ratio between the main shaft 25 of the prime mover and the crank shaft 20, by any suitable means, such as gearing or chain and sprocket drives or other variable or constant speed driving mechanism generally indicated at 26.

The brackets 11, 11 at the opposite sides of the apparatus are carried by arms 27, 27, said arms being pivotally mounted at one end to a suitable part of the boat. In the present instance, the arms 27, 27 are conveniently pivoted on the crank shaft 20, although any other suitable pivot mounted intermediate the opposite ends of the boat 23 may be used and from which said arms 27 project rearwardly and beyond the stern 28 of the boat.

The framework including the arms 27, 27 is provided with suitable hand grips or handles 29 which project rearwardly of the framework to a position to be readily gripped by the operator of the device who walks behind the device in the water flooding the bog and by means of the handles 29 steers the boat and controls the depth of operation of the agitators 1 and 2.

Obviously, the bottom C of the flooded bog will vary in elevation at different points throughout the area of the bog. Consequently, the water A will vary in depth at different places but by means of the handles 29 the operator may raise or lower the agitators 1 and 2 as the conditions vary, thereby bringing the agitators closer to the vines or closer to the surface of the water as desired or required but preferably at all times maintaining the agitators within the water so as to maintain constantly the suction action of the agitators and to prevent destructive slapping of the agitators on the surface of the water as would be caused by constantly moving the agitators clear of the water.

The arms 27, 27 are connected by a cross beam 30 at the outer ends of said arms and form together therewith a suitable pivoted framework 50. Obviously, other cross or diagonal bracing between the arms 27, 27 may be provided in order to stiffen the pivoted framework 50 and thereby keep the two arms 27 in substantially the same plane to maintain, as nearly as possible, a horizontal level of the agitators 1 and 2 at all times.

In order to counterbalance the weight of the framework 50 including the arms 27, 27 and cross beam 30 and the operating mechanism supported by the framework and thus take the weight of the operating mechanism off the arms of the operator, springs 31, 31 are provided in the present instance, the lower ends of said springs being connected to the cross bar 30 while the upper ends of the springs are connected, in the present instance, to the opposite sides of the outer end of a rearwardly extending inclined boom 32, the inner end 33 of which is suitably anchored in the boat 23.

The outer end of the boom 32 projects upwardly at an angle and outwardly beyond the stern 28 of the boat and lateral braces 34, 34 are provided to stiffen and support the boom 32.

When it is desired to remove the agitators 1 and 2 completely from the water A, suitable mechanism is provided for this purpose and which in the present instance takes the form of a block and tackle including a pulley block 35 carried by the outer end of the boom 32, a pulley block 36 connected to the cross beam 30 of the pivoted frame 50 which supports the agitators 1 and 2 and the operating mechanism therefor, and a rope 37 threaded through the blocks 35 and 36 in the usual manner, it being understood that one end of the rope 37 is connected preferably to one of the blocks 35 or 36 while the other end may be anchored to any suitable part of the boom or the pivoted frame, such, for example, as a rope cleat 38 carried by the cross beam 30, to hold the frame 50 in a raised position wherein the agitators are held clear of the water.

Upon referring to Fig. 1, it will be clear that operation of the prime mover 24 will cause a continuous rotation of the crank shaft 20 which, through the crank levers 19, crank pins 18, and reach rods 17, will cause an oscillation of the T-shaped or double bell-crank levers 12, 12. Oscillation of the levers 12, 12 causes vertical reciprocation of the posts 5 and 6 and consequently the alternate or opposed upward and downward movements of the agitating planks 1 and 2, the levers 9, 9 rocking in synchronization with the levers 12, 12 and being connected to the lower portions of the posts 5 and 6 maintains the posts 5 and 6 parallel to each other at all times throughout the rocking motion of said levers and the vertical reciprocations of the agitating planks 1 and 2.

As shown in Fig. 1, the posts 5 and 6 are provided with a series of openings 40 adjacent the upper ends thereof and a series of openings 41 adjacent the agitators 1 and 2, for the reception of the pivot pins or bolts 42 and 43 respectively by which the levers 9 and 12 are operatively connected to the posts 5 and 6, the series of openings 40 and 41 allowing for vertical adjustment of the posts 5 and 6 and consequently the agitators 1 and 2 relative to the levers 9 and 12, whereby the apparatus may be used in bogs having a greater depth of water than that illustrated in Fig. 1.

In order to propel the boat through the water A, a pair of dip-paddles 45, 45 are provided, one at each side of the boat 23. The dip-paddles 45, 45 are secured to the lower ends of paddle arms 46, 46 respectively. The paddle arms 46, 46 are pivotally mounted at 47, 47 to the reach rods 17, 17 at the opposite sides respectively of the boat, the upper ends of said paddle arms being pivotally connected at 48, 48 to the inner ends of links 49, 49, the outer ends of which are pivotally connected at 51 in the present instance to the cross member 30 of the pivotally mounted frame 50 which carries the agitators 1 and 2.

Upon referring to Fig. 1 it will be clear that as the cranks 19, 19 revolve in the direction of the arrow a, the reach rods 17, 17 will move in the direction of the arrow b and with the pivots 48, 48 of the paddle arms 46, 46 held by the links 49, 49 against forward and backward movement such movement of the reach rods 17, 17 will cause pivotal movements of the paddle arms 46, 46 about the pivots 48, 48 and a rearward movement of the paddles 45, 45 in the direction of the arrow c, said paddles being submerged in the water A at such times. As the crank pins 18, 18 swing rearwardly and upwardly during movement through the rear halves of their circles of rotation, the reach rods 17, 17 pivot about the points 52 at which said reach rods are pivotally connected to the arms 16, 16 of the T-shaped levers 12, 12. The opposite end of each reach rod moving upwardly with the crank pin 18 to which it is connected raises the pivots 47 and 48 of the paddle levers 46, 46 and thereby raises the paddles 45, 45 clear of the surface of the water A.

As the crank pins 18 travel through the top half of their circles of revolution, they carry the reach rods 17 forwardly, consequently moving the pivots 47 of the paddle arms 46 forwardly while the paddles 45 are in a raised position, consequently said paddles are moved forwardly while being held above the surface of the water A.

As the crank pins 18 move downwardly during the forward portion of their circles of revolution, the ends of the reach rods 17 connected thereto also move downwardly and carry the connections 47 for the paddle arms 46 downwardly, which causes the paddles 45 to dip into the water A for a start of a propelling stroke of said paddles and a repeat of the cycle just described.

From the above description, it will be clear that the device is of simple and efficient construction and includes no revolving parts in the water which could possibly tear and entangle the vines. It will also be clear that the vertical and horizontal surging of the water will loosen and agitate the vines so that any berries entrapped by the vines will be freed and permitted to float to the surface of the water.

I claim:

1. An apparatus for releasing loose submerged cranberries from vines in water flooding a bog, comprising water-agitating means submergible in said water, and means for vertically reciprocating said water-agitating means while in intimate contact with said water.

2. An apparatus for releasing loose submerged cranberries from vines in water flooding a bog, comprising water-agitating means including an element provided with a flat horizontal surface submergible in said water, and means for vertically reciprocating said element while in intimate contact with said water.

3. An apparatus for releasing loose submerged cranberries from vines in water flooding a bog, comprising a substantially flat horizontally disposed water-agitating element submergible in said water, and means for reciprocating said element vertically while in intimate contact with said water.

4. An apparatus for releasing loose submerged cranberries from vines in water flooding a bog, comprising a substantially flat relatively long horizontally disposed water-agitating element submergible in said water, and means for reciprocating said element vertically while in intimate contact with said water.

5. An apparatus for releasing loose submerged cranberries from vines in water flooding a bog, comprising a substantially flat relatively long horizontally disposed water-agitating element submergible in said water, and means at each end of said element for reciprocating said element vertically while in intimate contact with said water.

6. An apparatus for releasing loose submerged cranberries from vines in water flooding a bog, comprising water-agitating means submergible in said water, means for vertically reciprocating said water-agitating means while in intimate contact with said water, and means for resiliently supporting said water-agitating means.

7. An apparatus for releasing loose submerged cranberries from vines in water flooding a bog, comprising water-agitating means submergible in said water, means for vertically reciprocating said water-agitating means while in intimate contact with said water, floating means for supporting said water-agitating means and the reciprocating means therefor, and means carried by said floating means for resiliently supporting said water-agitating means with respect thereto.

8. An apparatus for releasing loose submerged cranberries from vines in water flooding a bog, comprising water-agitating means submergible in said water, means for vertically reciprocating said water-agitating means while in intimate contact with said water, floating means for supporting said water-agitating means and the reciprocating means therefor, means carried by said floating means for resiliently supporting said water-agitating means with respect thereto, and propelling means for said floating means.

9. An apparatus for releasing loose submerged cranberries from vines in water flooding a bog, comprising water-agitating means submergible in said water, means for vertically reciprocating said water-agitating means while in intimate contact with said water, floating means for supporting said water-agitating means and the reciprocating means therefor, propelling means for said floating means, and means carried by said floating means for resiliently supporting said water-agitating means and said propelling means with respect thereto.

10. An apparatus for releasing loose submerged cranberries from vines in water flooding a bog, comprising a float, a framework pivoted to said float and overhanging one end thereof, a substantially flat water-agitating element carried by said framework and submergible in said water, means carried by said float and said framework for vertically reciprocating said water-agitating element, and means for resiliently supporting the overhanging end of said framework with respect to said float.

11. An apparatus for releasing loose submerged cranberries from vines in water flooding a bog, comprising a float, a framework pivoted to said float and overhanging one end thereof, a substantially flat water-agitating element carried by said framework and submergible in said water, means carried by said float and said framework for vertically reciprocating said water-agitating element, means for resiliently supporting the overhanging end of said framework with respect to said float, and means carried by said framework for manually raising and lowering said water-agitating element.

12. An apparatus for releasing loose submerged cranberries from vines in water flooding a bog, comprising a float, a framework pivoted to said float and overhanging one end thereof, a substantially flat water-agitating element carried by said framework and submergible in said water, means carried by said float and said framework for vertically reciprocating said water-agitating element, means for resiliently supporting the overhanging end of said framework with respect to said float, means carried by the float for propelling said apparatus over said bog, and means carried by said framework for manually raising and lowering said water-agitating element and for guiding said apparatus over said bog.

13. An apparatus for releasing loose submerged cranberries from vines in water flooding a bog, comprising a pair of substantially flat horizontally disposed laterally spaced water-agitating elements submergible in said water, and means for simultaneously reciprocating said elements vertically in opposite directions one to the other.

14. An apparatus for releasing loose submerged cranberries from vines in water flooding a bog, comprising a pair of substantially flat elongated and laterally spaced water-agitating elements arranged horizontally in substantially parallel relation to each other and submergible in said water, and means for simultaneously reciprocating said elements vertically in opposite directions one to the other.

15. An apparatus for releasing loose submerged cranberries from vines in water flooding a bog, comprising a pair of substantially flat elongated and laterally spaced water-agitating elements arranged horizontally in substantially parallel relation to each other and submergible in said water, a float, a framework carried by and overhanging one end of said float, and means supported by said framework for simultaneously reciprocating said elements vertically in opposite directions one to the other.

16. An apparatus for releasing loose submerged cranberries from vines in water flooding a bog, comprising a pair of substantially flat elongated and laterally spaced water-agitating elements arranged horizontally in substantially parallel relation to each other and submergible in said water, a float, a framework carried by and overhanging one end of said float, means for simultaneously reciprocating said elements vertically in opposite directions one to the other, and means on said float for actuating the reciprocating means carried by said framework.

17. An apparatus for releasing loose submerged cranberries from vines in water flooding a bog, comprising a pair of substantially flat elongated and laterally spaced water-agitating elements arranged horizontally in substantially parallel relation to each other and submergible in said water, a float, a framework carried by and overhanging one end of said float, means for simultaneously reciprocating said elements vertically in opposite directions one to the other and including a rocking lever pivoted to said framework, means on said float for actuating the reciprocating means carried by said framework including a crank rotatably mounted on said float, and a reach rod connecting said rotary crank to said rocking lever on said framework.

18. An apparatus for releasing loose submerged cranberries from vines in water flooding a bog, comprising a pair of substantially flat elongated laterally spaced water-agitating elements arranged horizontally in substantially parallel relation to each other and submergible in said water, a float, a framework carried by and overhanging one end of said float, means for simultaneously reciprocating said elements vertically in opposite directions one to the other and including a rocking lever pivoted to said framework, means on said float for actuating the reciprocating means carried by said framework including a crank rotatably mounted on said float, a reach rod connecting said rotary crank to said rocking lever on said framework, a dip-paddle including an arm pivoted to said reach rod, and a link pivotally connected at one end to said paddle arm and at its opposite end to said framework.

19. An apparatus for releasing loose submerged cranberries from vines in water flooding a bog, comprising a pair of substantially flat elongated and laterally spaced water-agitating elements arranged horizontally in substantially parallel relation to each other and submergible in said water, a float, a framework carried by and overhanging one end of said float, means for simultaneously reciprocating said elements vertically in opposite directions one to the other and including a rocking lever pivoted to said framework, means on said float for actuating the reciprocating means carried by said framework including a crank rotatably mounted on said float, a reach rod connecting said rotary crank to said rocking lever on said framework, a dip-paddle including an arm pivoted to said reach rod, a link pivotally connected at one end to said paddle arm and at its opposite end to said framework, and means for resiliently supporting said framework and the mechanism carried thereby relative to the float.

20. An apparatus for releasing loose submerged cranberries from vines in water flooding a bog, comprising a pair of substantially flat elongated and laterally spaced water-agitating elements arranged horizontally in substantially parallel relation to each other and submergible in said water, a float, a framework carried by and overhanging one end of said float, means for simultaneously reciprocating said elements vertically in opposite directions one to the other and including a rocking lever pivoted to said framework, means on said float for actuating the reciprocating means carried by said framework including a crank rotatably mounted on said float, a reach rod connecting said rotary crank to said rocking lever on said framework, a dip-paddle including an arm pivoted to said reach rod, a link pivotally connected at one end to said paddle arm and at its opposite end to said framework, means for resiliently supporting said framework and the mechanism carried thereby relative to the float, and means carried by said framework for manually raising and lowering said framework relative to said float and said agitators and paddle with respect to said water.

ISAAC HARRISON.